May 16, 1950 L. T. HEIN 2,507,569
LOCK NUT
Filed June 3, 1946

INVENTOR
LOUIS T. HEIN
BY

ATTORNEYS

Patented May 16, 1950

2,507,569

UNITED STATES PATENT OFFICE 2,507,569

LOCK NUT

Louis T. Hein, Racine, Wis.

Application June 3, 1946, Serial No. 674,072

1 Claim. (Cl. 151—21)

My invention refers to nut locks and has for its primary object to provide a series of depressions about the upper face of a nut, the same intersecting the last thread of said nut, whereby a thin wall is developed to form trailing wedges upon the idle face of the thread, whereby the working faces of the nut and bolt are frictionally drawn together when the nut is set to firmly lock said nut against loosening through vibration, etc. The nut, furthermore, can be forcibly removed from its set position upon the bolt without marring the nut wedge feature, whereby said nut can be used indefinitely.

A further object of my invention is to provide the triangular depressions in the upper face of the nut, the triangular depressions having a short leading face and long trailing faces, the inner long face being outwardly beveled to facilitate proper depression for developing the wedges.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 2:
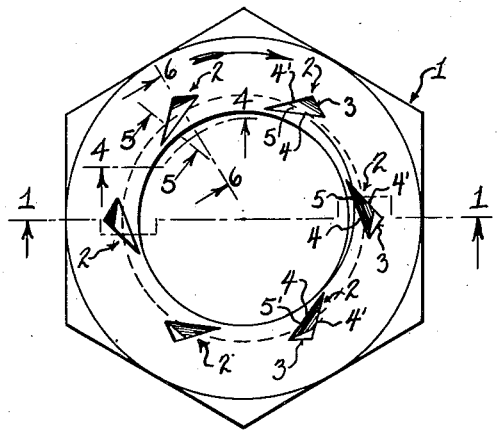
Fig. 2 is a plan view of the nut illustrating a series of tangentially disposed triangularly shaped depressions about the bore of the nut.
Figure 3:
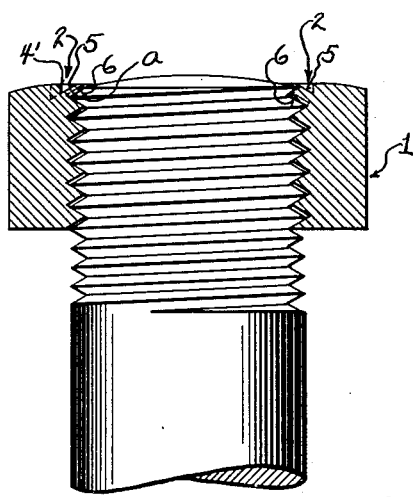
Fig. 3 is a sectional elevation of the nut as indicated by line 1—1 of Fig. 2, the nut being set upon a threaded bolt end.

Referring by characters to the drawings, 1 indicates a standard threaded bore nut, the upper face of the same being formed with a series of triangular shaped depressions 2—2. As best shown in Fig. 2, the triangular depressions trail each other in spaced relationship around and adjacent the bore of the nut. Each of said depressions has a leading short base side 3 and long merging trailing sides 4 and 4'. The trailing side 4 of each depression that is arranged adjacent the bore is tangentially arranged with respect thereto but terminates short of contact therewith. Each depression slopes outwardly from the long trailing side 4 as shown at 5, at approximately an angle corresponding to the angle of the under side of the last nut thread, whereby the metal displaced forms a thin edge paralleling the last thread $a$ of the nut. Hence, it will be noted that owing to the tangentially disposed depressions, which form wedges, when the nut is run upon a thread, these wedges will exert a gradual compression tension upon the bolt threads.

Figure 4:
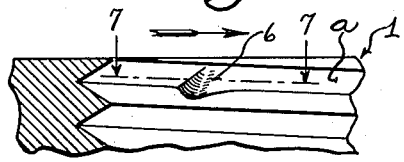
Fig. 4 is a magnified fragmentary sectional view through the nut threads illustrating one of the wedges, the section being indicated by line 4—4 of Fig. 2.
Figure 5:
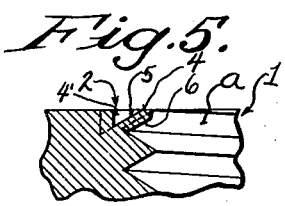
Fig. 5 is a similar fragmentary sectional view through one of the nut depressions, the section being indicated by line 5—5 of Fig. 2.
Figure 6:
Fig. 6 is a similar sectional view through the nut and a depression therein upon another plane, as indicated by line 6—6 of Fig. 2.
Figure 7:
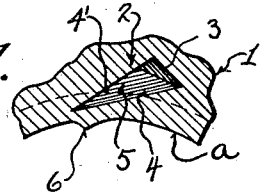
Fig. 7 is a plan sectional view through one of the triangular shaped nut depressions and wedge developed thereby, the section being indicated by line 7—7 of Fig. 4.
Figure 7:

It is apparent that, due to the forging of the depressions, the thin trailing edge 5 is approximately at an angle corresponding to the angle of the last nut thread, whereby the face of the same is depressed to exert pressure upon a bolt threaded gradually, due to the fact that the pressure surface is tangentially disposed, whereby the said surface depression is gradual, the metal upon the idle face of the last thread will bulge to form a wedge 6, as best indicated in Figs. 4 and 7 of the drawings. The trailing faces of these wedges are comparatively long and merge into the metal, while the leading face is comparatively quite short.

Figure 1:
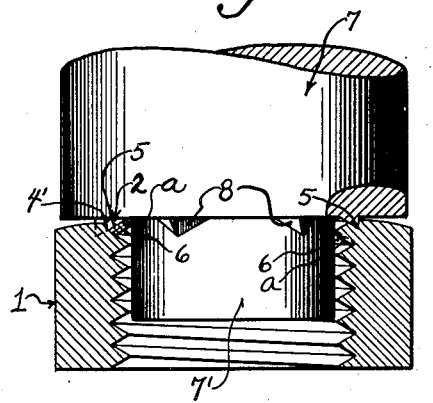
Fig. 1 represents a sectional elevation of a nut embodying the features of my invention, having fitted therein a wedge forming mandril, the section through the nut being indicated by line 1—1 of Fig. 2.

The wedges are formed with a mandril 7, as best shown in Fig. 1 of the drawings, and the core 7' of said mandril is nested within the bore of the nut. The face of the mandril is provided with raised triangular shaped lugs 8, which lugs form the nut depressions when the mandril is depressed, under suitable power, upon the face of the nut.

From the foregoing description, it will be apparent that an efficient nut lock is formed upon the upper face of the nut with each downward movement of the mandril, whereby the idle face of the last nut thread is formed with wedges more or less pronounced. Hence, when the nut is run onto a threaded bolt, as indicated by the arrow in Fig. 1, and finally set thereon, the wedges, upon the idle face of the last nut thread, will exert a lifting pressure, whereby the working faces of the nut and bolt will be frictionally drawn together to exert high pressure on said faces, which will serve as a positive lock against the nut being loosened by vibration, or from other causes.

It is also apparent that the nut may be removed from the bolt by exerting sufficient pressure upon it, and in this removal the wedged locking faces will not be marred. Hence, the nut may be used over and over again.

I claim:

A threaded nut for engagement with a threaded bolt comprising a body having an axially disposed bore and a series of similar triangular depressions formed in the top face thereof and trailing each other in spaced relationship around and adjacent the bore, each of said depressions having a leading short base side and merging long trailing sides, the trailing side of each depression adjacent the bore being tangentially arranged with respect thereto but terminating short of contact therewith, and each depression from said trailing side sloping outwardly at approximately an angle corresponding to the angle of the under side of the last nut thread whereby a series of gradual correspondingly inclined wedges are formed on said thread.

LOUIS T. HEIN.

REFERENCES CITED

The following references are of record in the file of this patent:

UNITED STATES PATENTS

| Number | Name | Date |
| --- | --- | --- |
| 2,352,668 | Tripp | July 4, 1944 |